United States Patent
Mundt et al.

[11] Patent Number: 4,685,785
[45] Date of Patent: Aug. 11, 1987

[54] INTEGRAL PLASTIC FRAME FOR HOLDING A FILM SLIDE

[75] Inventors: Peter Mundt, Garmisch-Partenkirchen; Arnold Neuhold, Farchant; Claus Pohl, Eschenlohe, all of Fed. Rep. of Germany

[73] Assignee: Geimuplast Peter Mundt GmbH. & Co. KG., Farchant, Fed. Rep. of Germany

[21] Appl. No.: 814,258

[22] Filed: Dec. 30, 1985

[30] Foreign Application Priority Data

Jan. 17, 1985 [DE] Fed. Rep. of Germany ....... 3501425

[51] Int. Cl.$^4$ ............................................. G03B 21/64
[52] U.S. Cl. ..................... 353/120; 40/152; 40/158 B
[58] Field of Search ............... 353/120; 40/100, 16, 40/152, 156, 158 B

[56] References Cited

U.S. PATENT DOCUMENTS

| | | | |
|---|---|---|---|
| T921,013 | 4/1974 | Tucker | 353/120 |
| 1,474,174 | 11/1923 | Segall | 40/158 B |
| 2,528,366 | 10/1950 | Houston | 40/152 |
| 2,958,971 | 11/1960 | Plettner | 40/152 |
| 3,044,198 | 7/1962 | Badalich | 40/152 |
| 3,369,338 | 2/1968 | Koeppe et al. | 40/152 |
| 4,461,105 | 7/1984 | Thebault | 40/152 |
| 4,518,080 | 5/1985 | Ohlson | 40/16 |

FOREIGN PATENT DOCUMENTS

| | | |
|---|---|---|
| 700519 | 12/1940 | Fed. Rep. of Germany . |
| 1128681 | 4/1962 | Fed. Rep. of Germany . |
| 1815522 | 8/1969 | Fed. Rep. of Germany . |
| 1810092 | 4/1970 | Fed. Rep. of Germany . |
| 7234660 | 9/1972 | Fed. Rep. of Germany . |

Primary Examiner—Charles Frankfort
Assistant Examiner—Patrick R. Scanlon
Attorney, Agent, or Firm—Fleit, Jacobson, Cohn & Price

[57] ABSTRACT

A integral plastic frame for holding a film slide includes a central window, a recessed bearing surface, which surrounds the window and serves to contact the film slide when it has been inserted to cover the window. The transparency as it is inserted and in its final position is guided between the bearing surface and the retaining elements facing the bearing surface. The retaining elements substantially consist of continuous retaining strips, which extend in the direction in which the film slide is inserted. The retaining strips are attached to mutually opposite sides of a central window of the integral frame member by means of narrow connecting webs, which extend at right angles to the direction in which the film slide is inserted. The plastic material of the frame member is so elastically flexible that an opening through which the film slide can be inserted is formed between the retaining strip and the bearing surface.

3 Claims, 3 Drawing Figures

INTEGRAL PLASTIC FRAME FOR HOLDING A FILM SLIDE

BACKGROUND OF THE INVENTION

1. Field of the Invention

This invention relates to an integral plastic frame for holding a film slide, which frame comprises a central window, a recessed bearing surface, which surrounds the window and serves to contact the film slide when it has been inserted to cover the window, wherein the film slide as it is inserted and in its final position is guided between the bearing surface and the retaining elements facing the bearing surface, and the retaining elements substantially consist of continuous retaining strips, which extend in the direction in which the transparency is inserted.

2. Description of the Prior Art

Such frame has been disclosed in German Patent Specification No. 1,128,681. The known frame is provided on two mutually opposite sides of the central window with track grooves, which are defined by the bearing surface and the overlying wall portions and guide the film slide as it is inserted, the opening through which the film slide is inserted is offset from said grooves, and the film is flexible. It is not apparent from that printed publication whether the integral plastic slide frame is elastic. The projections might be replaced by overlying continuous wall portions, provided that they leave an opening through which the film slide can be inserted. But such frame could be made only by a complicated injection mold. When it is desired to remove a film slide which has been inserted, a hairpin or the like must be applied below the edge of the inserted film slide at the apex of a V-shaped edge so that the film slide can be lifted out. Such frame requires improvement in the following respects. The width of the opening through which the film slide can be inserted (corresponding to the height of the film bed) is too small for a mounting of cambered film, which may also be scratched as it is inserted. The free edges of the inserted film slide can easily curve upwardly, e.g., when the film slide is heated in a projector. The known frame cannot be used for an automatic mounting or such automatic mounting would be difficult.

German Patent Specification No. 700,519 discloses a frame which consists of two frame halves, which can be moved toward each other about a hinge. Such frame cannot be used for an automatic mounting because the frame cannot be closed until the cut film slide has been inserted. The film slide and the cover glass plates embedding the film slide are held by plate edges, which are bent in the same direction at right angles to a frame half and which constitute a receptacle for the film slide and the associated cover glass plates. A cambered film may slip from the position for projection before the frame is closed. The expenditure of material is about as high as for the frame in accordance with German Utility Model No. 72 34 660, which will be discussed hereinafter.

German Utility Model No. 1,815 522 discloses a holder for film sections. That holder comprises frame parts for receiving and holding the edge surface of the film sections. Said frame parts are constituted by an integral molding and the picture gate is laterally provided with a peripheral slot for receiving the film section. That slot is open on one side to form a opening through which a film section can be inserted into one frame part. That known frame involves a relatively high expenditure of material and can be made only by means of an expensive mold, which is liable to be deranged and comprises a slider mechanism. The film bed has a relatively large thickness (in excess of 0.3 mm) so that a proper fixation of the film in the frame is not ensured.

German Utility Model No. 72 34 660 discloses a plastic slide frame which comprises a frame member that is preferably provided with a continous peripheral rim and another frame part which consists of a flat cover and is preferably embedded within the frame member and is connected to the latter by a film hinge. That frame also involves a high expenditure of material and can be made only by an expensive mold because the frame when swung open has a very large projected area. The hinge is susceptible to damage. An additional operation for closing the frame is required. Expensive additional equipment consisting of an ultrasonic welder is required for closing the frame.

SUMMARY OF THE INVENTION

It is an object of the invention so to improve the frame described first hereinbefore that it can readily be used for an automatic mounting and that it can be made at low cost because it involves only a low expenditure of tooling, material and labor.

The object set forth is accomplished by the combination of the features which reside in that the retaining strips are attached to mutually opposite sides of a central window of integral frame member by means of narrow connecting webs, which extend at right angles to the direction in which the film slide is inserted, and the plastic material of the frame member is so elastically flexible that an opening through which the film slide can be inserted can be formed between the retaining strip and the bearing surface. Briefly stated, the frame in accordance with the invention consists only of one frame half. The frame in accordance with the invention can be used for following new applicatins:

For a provisional mounting of reversal films for a subsequent filing and for a quick projection; as a particularly low-cost frame for reversal films for low demands or for a small number of projections, and as a demonstrating frame for customers who desire a mounting in glass but wish to have the pictures projected so that they can select those to be mounted. All said applications do not require frame having a special stability, such as thermal stability, and a positioning and fixation of the film in the frame.

In a preferred embodiment, the bearing surface may be interrupted adjacent to each connecting web. Such frame affords the advantage that it can be made by means of a mold having no slider.

DETAILED DESCRIPTION OF THE PREFERRED EMBODIMENT

Figure 1:
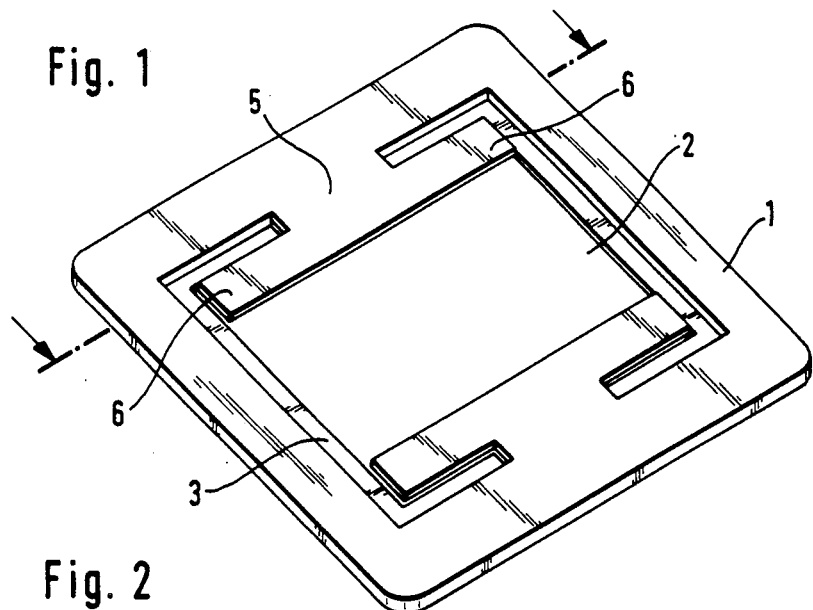
FIG. 1 is a top plan view showing one side of the frame.

The invention will be explained by way of example in the following description with reference to an illustrative embodiment shown on the drawing.

Figure 2:
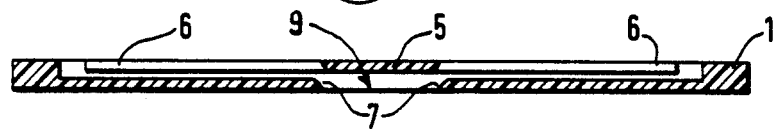
FIG. 2 is a sectional view showing a frame as illustrated in FIG. 1.

The integral frame made of elastic plastic comprises essentially a single frame member 1, which has a central window 2. The window 2 is surrounded by recessed bearing surfaces 3 for the film slide 4 which has been inserted and covers the window 2. Projections which extend over and beyond the bearing surfaces 3 are provided on two mutually opposite sides of the window 2. Each projection consists of a connecting web 5, which extends at right angles to the direction in which the film slide 4 is inserted, and a retaining strip 6, which extends at right angles to the web in the direction in which the film slide 4 is inserted. The retaining strips are parallel to the adjacent bearing surfaces 3 and overlie the film slide 4, which covers the window 2. The retaining strips extend as far as to those portions of the bearing surfaces 3 which extend at right angles to the retaining strips 6. As is apparent from FIG. 2, a track groove 8 is defined by the connecting web 5 and that portion of the bearing surfaces 3 which faces the web 5. It is also apparent from FIG. 2 that the bearing surfaces 3 are interrupted adjacent to the connecting web 5. The edges formed at the gaps 9 between the bearing surfaces 3 are chamfered at 7 to facilitate the insertion of the film slide 4.

Figure 3:
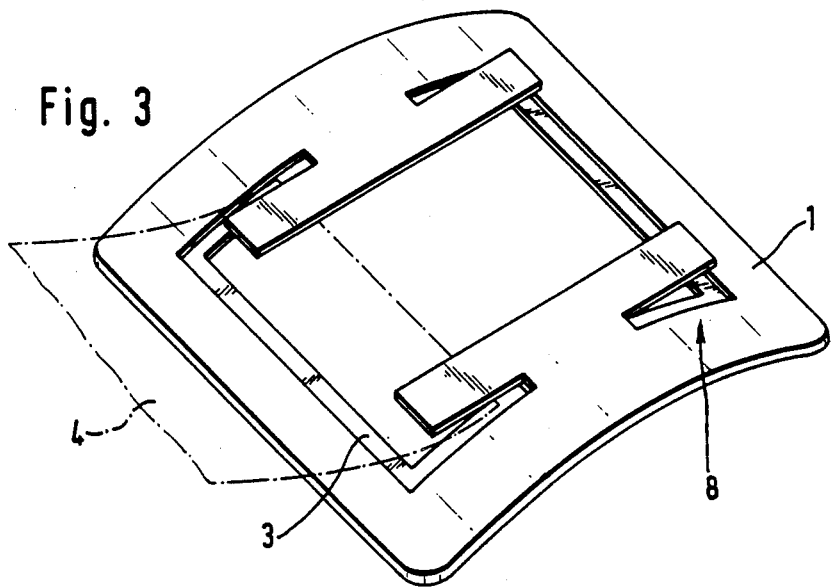
FIG. 3 shows the frame during the mounting of a film slide.

As is apparent from FIG. 3 the film can easily be mounted in that the frame is expanded by bending. That expanding by bending may be effected by hand or by machine. An expanding by bending effected by machine can be carried out substantially in accordance with the teachings of German Patent Specification No. 18 10 092.

The advantages afforded by the frame in accordance with the invention are as follows: Because the non-projected areas of the film sections are covered only in a smaller area, the expenditure of material is minimized. Different from the known hinged frame there is no need for an additional operation after injection molding so that the expenditure of labor and machinery will be low. The molds are utilized better than in case of the hinged frame because the projected surface has only one-half the previous area. The frame can be made by means of a simple mold without a need for additional, movable mold elements (slider). The frame permits a simple mounting in that it is expanded by bending. The film may be clamped by the expanded frame. The film slide is held in the film bed by a peripheral rim. Owing to the expanding of the frame by bending there is no risk of a canting or scratching of the film slide as it is inserted.

When the film slide has partly been inserted and has then been cut off, the film slide can be pulled to its final position in known manner by a gripping implement, particularly by pliers. The film slide can easily be removed from the frame in that the frame member is bent.

We claim:

1. A frame for holding a film slide, said frame comprising:
    a frame body,
    a central window defined by said frame body,
    two recessed bearing surfaces substantially surrounding said window for contacting the film slide when the film slide is inserted into said window,
    two webs, each web being attached at one end to a respective one of two mutually opposite sides of said window and extending substantially perpendicular to a direction of insertion of the film slide into said window, said webs being located over respective gaps defined between opposed ends of said two recessed bearing surfaces, and
    two retaining strips, each retaining strip being
    attached at the other end of a respective one of said webs and extending substantially parallel to the direction of insertion of the film slide into said window,
    said webs and said retaining strips extending into said window beyond said recessed bearing surfaces and said gaps so that only one side of the film slide is held at any point by one of said recessed bearing surfaces, said webs and said retaining strips,
    said frame body being sufficiently flexible so that edges of the film strip are allowed to be guided through track grooves defined by said webs and portions of said recessed bearing surfaces extending parallel to said retaining strips so that when said frame body is placed in a temporarily deformed state, the film strip is guided along said track grooves, and is reliably held between said retaining strips and said bearing surfaces to cover said window upon return of said frame body from the temporarily deformed state.

2. The frame of claim 1, wherein edges of said retaining strips teminate adjacent to said bearing surfaces.

3. The frame of claim 1, wherein edges of said bearing surfaces defining said gaps are chamfered to facilitate insertion of the film slide in said window.

* * * * *